US009221583B2

(12) United States Patent
Ozawa et al.

(10) Patent No.: US 9,221,583 B2
(45) Date of Patent: *Dec. 29, 2015

(54) CAN WITH BISPHENOL A CAPTURE SYSTEM

(71) Applicant: Empire Technology Development LLC, Wilmington, DE (US)

(72) Inventors: Fujiko Ozawa, Yokohama (JP); Takahisa Kusuura, Kawasaki (JP)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/683,894

(22) Filed: Nov. 21, 2012

(65) Prior Publication Data

US 2013/0081357 A1 Apr. 4, 2013

Related U.S. Application Data

(63) Continuation of application No. 13/201,607, filed as application No. PCT/US2010/049808 on Sep. 22, 2010, now Pat. No. 8,337,967.

(51) Int. Cl.
*B65D 25/14* (2006.01)
*B21D 51/26* (2006.01)
(Continued)

(52) U.S. Cl.
CPC ............. *B65D 25/14* (2013.01); *B21D 51/26* (2013.01); *B32B 1/00* (2013.01); *B32B 5/022* (2013.01); *B32B 15/14* (2013.01); *B32B 15/18* (2013.01); *B32B 15/20* (2013.01); *B32B 33/00* (2013.01);
(Continued)

(58) Field of Classification Search
CPC .... B21D 51/26; B32B 2439/66; B65D 25/14; C09D 163/00; C09D 5/40
USPC .......................................................... 428/38.5
See application file for complete search history.

(56) References Cited

U.S. PATENT DOCUMENTS 3,960,979 A    6/1976   Khanna
4,020,034 A    4/1977   Freiter
(Continued)

FOREIGN PATENT DOCUMENTS

JP    2002-066315    3/2002
JP    3430257        7/2003
(Continued)

OTHER PUBLICATIONS

Ahmaruzzaman, M., "Adsorption of phenolic compounds on low-cost adsorbents: A Review," Adv. Colloid. Interface Sci., Nov. 4, 2008, vol. 143, pp. 48-67.
(Continued)

*Primary Examiner* — Jennifer Chriss
*Assistant Examiner* — Camie Thompson
(74) *Attorney, Agent, or Firm* — Foley & Lardner LLP

(57) ABSTRACT

The present technology provides a bisphenol A capture system for food and beverage containers which include BPA-containing coatings. The capture system is made of one or more materials which bind any BPA eluting from the BPA-containing coating. The present capture system therefore reduces or prevents BPA from migrating from the can coating into the food or beverages stored in the can. The present technology further provides methods of manufacturing and using such coatings.

17 Claims, 2 Drawing Sheets

(51) Int. Cl.
| | |
|---|---|
| B65B 29/00 | (2006.01) |
| B32B 1/00 | (2006.01) |
| B32B 5/02 | (2006.01) |
| B32B 15/14 | (2006.01) |
| B32B 15/18 | (2006.01) |
| B32B 15/20 | (2006.01) |
| B32B 33/00 | (2006.01) |
| C09D 5/08 | (2006.01) |
| C09D 163/00 | (2006.01) |

(52) U.S. Cl.
CPC ............... *B65B 29/00* (2013.01); *C09D 5/086* (2013.01); *C09D 163/00* (2013.01); *B32B 2250/02* (2013.01); *B32B 2255/06* (2013.01); *B32B 2255/26* (2013.01); *B32B 2307/73* (2013.01); *B32B 2439/66* (2013.01); *B32B 2439/70* (2013.01); *Y10T 156/1048* (2015.01); *Y10T 428/13* (2015.01)

(56) References Cited

U.S. PATENT DOCUMENTS

| | | | |
|---|---|---|---|
| 4,146,452 | A | 3/1979 | Weber et al. |
| 4,179,418 | A | 12/1979 | Waddill |
| 4,289,674 | A * | 9/1981 | Christenson et al. .......... 523/100 |
| 4,353,934 | A | 10/1982 | Nakashima et al. |
| 4,508,765 | A | 4/1985 | Ring et al. |
| 4,554,342 | A | 11/1985 | Corley |
| 5,177,129 | A * | 1/1993 | Bobo, Jr. ........................ 524/48 |
| 6,713,011 | B2 | 3/2004 | Chu et al. |
| 7,390,760 | B1 | 6/2008 | Chen et al. |
| 7,416,758 | B2 | 8/2008 | Park et al. |
| 8,940,881 | B2 * | 1/2015 | Ifuku ........................ D01F 9/00 524/27 |
| 2002/0100725 | A1 | 8/2002 | Lee et al. |
| 2004/0254332 | A1 | 12/2004 | Hayes |
| 2006/0193994 | A1 | 8/2006 | Penttinen et al. |
| 2008/0021545 | A1 * | 1/2008 | Reneker ................ A61F 2/0063 623/1.46 |
| 2009/0264578 | A1 * | 10/2009 | Minaki et al. ................. 524/502 |
| 2012/0045954 | A1 * | 2/2012 | Bleecher et al. ................ 442/80 |
| 2012/0125801 | A1 * | 5/2012 | Kainz et al. ................ 206/524.3 |

FOREIGN PATENT DOCUMENTS

| | | |
|---|---|---|
| JP | 2006-063271 | 3/2006 |
| JP | 2007-268351 | 10/2007 |
| JP | 2009-000683 | 1/2009 |
| JP | 2009-242556 | 10/2009 |
| WO | WO-98/40443 | 9/1998 |
| WO | WO-2007/046302 | 4/2007 |
| WO | WO2010/073758 | * 7/2010 |

OTHER PUBLICATIONS

Aoki, N. et al., "Synthesis of chitosan derivatives bearing cyclodextrin and adsorption of p-nonylphenol and bisphenol A," Carbohydrate Polymers, 2003, vol. 52, pp. 219-223.
Crini, G., "Recent developments in polysaccharide-based materials used as adsorbents in wastewater treatment," Prog. Polym. Sci., 2005, vol. 30, pp. 38-70.
Ecplaza, "Slot Die Coater—Mitsubishi Materials/Wear Resistant Tools," printed on Jun. 1, 2011, retrieved from the internet: URL:<http://www.ecplaza.net/product/26957_1054508/slot_die_coater.html> 5 pages.
Ichikawa, T. et al., "Bisphenol A-imprinted polymer for environmental water purification," printed on Jun. 1, 2011, retrieved from the internet:URL:<http://www.env.go.jp/chemi/end/2001report/pdf_abs/pg/PG_37.pdf>, 1 page.
Ikegami, T. et al., "Synthetic polymers adsorbing bisphenol A and its analogues prepared by covalent molecular imprinting using bisphenol A dimethacrylate as a template molecule," Anal. Bioanal. Chem., 2004, vol. 378, pp. 1898-1902.
Infrared-Systems, "Infrared Heaters, IR Electric, Ultraviolet Heater," printed on Jun. 1, 2011, retrieved from the internet: URL:<http://www.infrared-systems.com/heaters.htm>, 2 pages.
Innext Co., Ltd, "FPD (Flat Panel Display) Manufacturing Equipment—Slit Coater," printed on Jun. 1, 2011, retrieved from the internet: URL:<http://www.innext.co.jp/en/products_seizo.html>, 4 pages.
International Search Report and Written Opinion for PCT/US10/49808 mailed Apr. 12, 2011.
Kes, "NEU—Nanofiber Electrospinning Unit," printed on Jun. 1, 2011, retrieved from the internet: URL:<http://english.keskato.com.jp/products/neu.html>, 5 pages.
Ki, C.S. et al., "Nanofibrous membrane of wool keratose/silk fibroin blend for heavy metal ion adsorption," J. Membrane Science, 2007, vol. 302, pp. 20-26.
Kubo, T. et al., "On-column concentration of bisphenol a with one-step removal of humic acids in water," J. Chromatography A, 2003, vol. 987, pp. 389-394.
Kubo, T. et al., "Polymer-based adsorption medium prepared using a fragment imprinting technique for homologues of chlorinated bisphenol A produced in the environment," J. Chromatography A, 2004, vol. 1029, pp. 37-41.
National Institute for Environmental Studies, "Development of selective capture of environmental pollutants using pseudomolecualar template," printed on Jun. 8, 2011, retrieved from the internet: URL:<http://www.nies.go.jp/nanotech/select/plan.html>, 5 pages.
Non-Final Office Action received in U.S. Appl. No. 13/078,792 mailed Mar. 21, 2012 (9 pages).
Notice of Allowance received in U.S. Appl. No. 13/078,792 mailed Aug. 21, 2012 (11 pages).
Ohkawa, K. et al., "Electrospinning of Chitosan," Macromolecular Rapid Communications, 2004, vol. 25, pp. 1600-1605.
Ohkawa, K. et al., "Preparation of Pure Cellulose Nanofiber via Electrospinning," Textile Research Journal, Oct. 2009, vol. 79, No. 15, pp. 1396-1401.
Pillai, C.K.S., et al., "Electrospinning of Chitin and Chitosan Nanofibres," Trends Biomater. Artif. Organs, 2009, vol. 22, pp. 179-201.
Roberts, G. et al., "Determination of the viscometric constants for chitosan," International Journal of Biological Macromolecues, 1982, vol. 4, pp. 374-377.
SCS Coatings, "Precision IRT—IR-Thermal Cure Oven," printed on Jun. 1, 2011, retrieved from the internet: URL:<http://www.scscoatings.com/parylene_equipment/irt_uv-cure-ovens.aspx>, 2 pages.
Su, W.F.A. et al., "Comparison of Cure Conditions for Rigid Rod Epoxy and Bisphenol A Epoxy Using Thermomechanical Analysis," J. Applied Polymer Science, 1998, vol. 70, pp. 2163-2167.
Takeda, K. et al., "Bisphenol A imprinted polymer adsorbents with selective recognition and binding characteristics," Science and Technology of Advanced Materials, 2005, vol. 6, pp. 165-171.
Uyar, T. et al., "Molecular filters based on cyclodextrin functionalized electrospun fibers," J. Membrane Sci.. 2009. vol. 332, pp. 129-137.
Wikipedia, "Electrospinning," printed on Jun. 8, 2011, retrieved from the internet: URL:<http://en.wikipedia.org/wiki/Electrospinning>, 7 pages.
Wikipedia, "Lotus Effect," printed on Jun. 6, 2011, retrieved from the internet: URL:<http://en.wikipedia.org/wiki/Lotus_effect>, 4 pages.
International Preliminary Report on Patentability issued for PCT/US2010/049808 mailed Apr. 4, 2013.
"Ministry of Health, Labour and Welfare: A Q & A on bisphenol A," created Jul. 8, 2008, accessed at https://web.archive.org/web/20100827080732/http://www.mhlw.go.jp/topics/bukyoku/iyaku/kigu/topics/080707-1.html, accessed on Feb. 19, 2015, 7 pages.
Non-Final Office Action in U.S. Appl. No. 13/201,607 dated Mar. 21, 2012 (5 pages).
Notice of Allowance in U.S. Appl. No. 13/201,607 dated Aug. 21, 2012 (8 pages).

* cited by examiner

CAN WITH BISPHENOL A CAPTURE SYSTEM

CROSS-REFERENCE TO RELATED APPLICATIONS

This application is a continuation under 35 U.S.C. §120 of U.S. patent application Ser. No. 13/201,607, filed Aug. 15, 2011, now U.S. Pat. No. 8,337,967, which is a U.S. national stage application under 35 U.S.C. §371 of International Application No. PCT/US2010/049808, filed on Sep. 22, 2010. Both applications are incorporated herein by reference, in their entireties, for any and all purposes.

BACKGROUND

Metal cans designed to store food and beverages are typically coated with a polymer to prevent contact between the interior surface of the can and the food or beverage. Such coatings protect the surface of the can from corrosion by the contents of the can and subsequent contamination of the food or beverage. Epoxy-based coatings are widely used for this purpose. Many such coatings comprise the chemical compound bisphenol A (2,2-bis(p-hydroxyphenyl)propane; also known as BPA), either as a component of the polymer and/or a plasticizer.

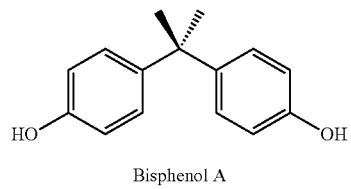

Bisphenol A

A number of recent studies have indicated that ingestion of small amounts of BPA poses a health hazard and that BPA can leach into the food or beverages being stored in cans coated with BPA-containing polymers.

SUMMARY

The present technology provides a bisphenol A capture system for metal cans and other food or beverage containers which include BPA-containing coatings. The capture system is made of one or more materials which capture (bind) BPA from the BPA-containing coating. The present capture system therefore reduces or prevents BPA from migrating from the can coating into the food or beverages stored in the can. The present technology further provides methods of manufacturing and using such coatings.

Thus, in accordance with one aspect, there is provided a metal can which includes an interior surface, wherein at least a portion of the interior surface is covered with one or more of a first coating comprising bisphenol A, and a second coating comprising an electrospun bisphenol A binding material, wherein the first coating is in contact with the interior surface and the second coating is at least partially layered over the first coating. In some embodiments, the metal may be selected from the group consisting of iron, aluminum, tin, steel, an alloy of any one thereof, and a mixture of any two or more thereof. In some embodiments the first coating may be an epoxy resin or polycarbonate resin.

In some embodiments, the second coating is configured to bind substantially all of the bisphenol A leaching from the first coating. In certain embodiments, the electrospun material of the second coating naturally binds bisphenol A. Such naturally BPA-binding materials include, e.g., chitin, chitosan, dextrin, fibroin, keratin and mixtures of any two or more thereof. In other embodiments, the binding material of the second coating has been adapted to binding bisphenol A by molecular imprinting using a bisphenol A compound. Such materials include, e.g., cellulose, cellulose acetate, cellulose acetate butyrate, lignocellulose, polyamine, N-alkyl acrylamide, N-vinyl pyrrolidone and a mixture of any two or more thereof.

In another aspect, the present technology provides a metal can including an interior surface wherein at least a portion of the interior surface is coated with a coating comprising bisphenol A and an electrospun material that binds bisphenol A. In such a can, the coating may include, but is not limited to, an epoxy resin or polycarbonate resin. The electrospun material may bind substantially all of the bisphenol A in the coating. Also, the electrospun material may naturally bind bisphenol A such as where the electrospun material is selected from chitin, chitosan, dextrin, fibroin, keratin and mixtures of any two or more thereof. The electrospun material may also be a material adapted to binding bisphenol A by molecular imprinting using bisphenol A or a bisphenol A compound. The imprinted electrospun material may be selected from the group consisting of cellulose, cellulose acetate, cellulose acetate butyrate, lignocellulose, polyamine, N-alkyl acrylamide, N-vinyl pyrrolidone and a mixture of any two or more thereof.

In one aspect, the present technology provides a metal can includes an interior surface in which at least a portion of the interior surface is coated with an epoxy resin comprising bisphenol A and an electrospun coating layered over the epoxy resin coating wherein the electrospun coating is selected from cellulose, cellulose acetate, cellulose acetate butyrate, or lignocellulose. In another aspect, the metal can includes an interior surface coated with an electrospun coating comprising both a BPA-containing polymer and a BPA-binding material.

In another aspect, the present technology provides methods of manufacturing the bisphenol A capture system described herein. The methods include layering an electrospun bisphenol A-binding material onto a coating comprising bisphenol A, wherein the coating covers at least a portion of a metal substrate, such as a metal sheet or a metal can. Where the metal substrate is a metal sheet, the methods may further comprise forming a can from the coated metal sheet such that the coating comprises an interior surface of the can. However, formation of the can may take place before or after the layering of the electrospun bisphenol A-binding material onto the coating comprising bisphenol A. In other embodiments, the methods include forming a first coating comprising bisphenol A on a metal sheet, layering an electrospun bisphenol A-binding material onto the first coating, and forming a can from the coated metal sheet such that the coating comprises an interior surface of the can. In still other embodiments, the methods include layering an electrospun bisphenol A-binding material onto a coating comprising bisphenol A, wherein the coating covers at least a portion of an interior surface of a metal can.

In the present methods of manufacturing, the metal of the can or sheet may be selected from the group consisting of iron, aluminum, tin, steel, an alloy of any one thereof, and a mixture of any two or more thereof. The coating containing BPA may be, e.g., an epoxy resin or polycarbonate resin. The electrospun material may be selected from chitin, chitosan, dextrin, fibroin, keratin and mixtures of any two or more thereof. In some embodiments of the present methods, the BPA-binding material has been adapted to binding bisphenol A by molecular imprinting using a bisphenol A compound. Such materials may be selected from the group consisting of cellulose, cellulose acetate, cellulose acetate butyrate, lignocellulose, polyamine, N-alkyl acrylamide, N-vinyl pyrrolidone and a mixture of any two or more thereof.

In another aspect the present technology provides methods of using the metal cans comprising the present BPA-capture system. Thus, in one embodiment, such methods include filling any of the cans described herein in whole or in part with a food or beverage. In other embodiments, the methods include storing a food or beverage in any of the cans described herein.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
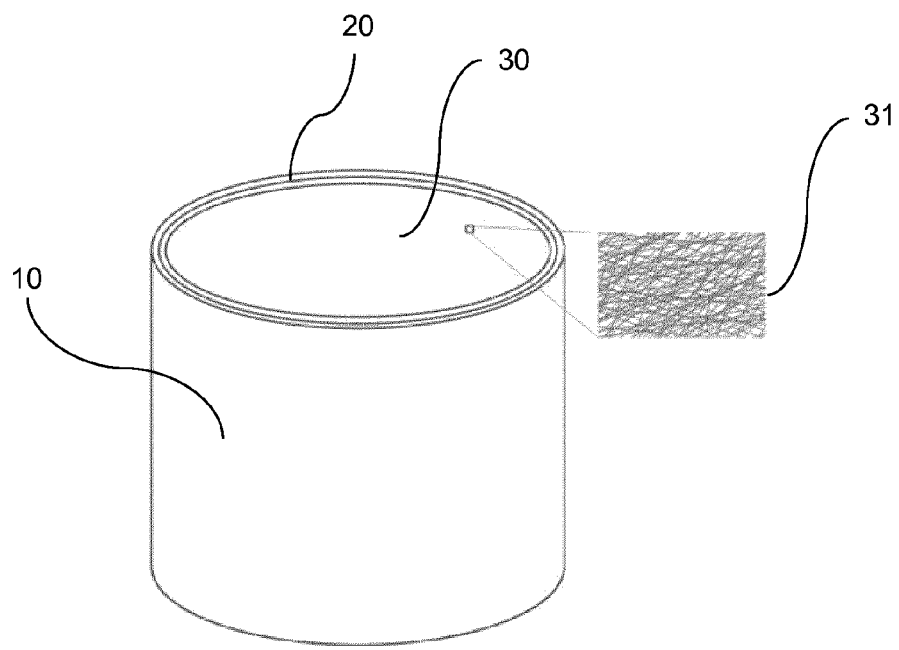
FIG. 1 depicts an illustrative embodiment of a can with a BPA capture system of the present technology.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present technology provides a can with a coating made from one or more materials which bind (capture) BPA and which coating covers (in whole or in part) a BPA-containing coating on the surface of the can. The BPA-binding material thus reduces or prevents BPA from migrating from the BPA-containing coating into the contents of the can. This BPA-capture coating is formed by electrospinning the BPA-binding material to provide a microporous layer of nanofibers. In one aspect, this technology provides an electrospun inner coating over a BPA-containing coating such as an epoxy resin, for food and beverage cans. Because the porous nanofiber layer is hydrophobic, the coating not only captures BPA but also prevents the food or beverage contents from contacting the BPA-containing coating.

FIG. 1 shows an illustrative embodiment of a can with the BPA-capture system of the present technology. In FIG. 1, the can 10 is made of any suitable metal, e.g., steel, iron, aluminum, tin, an alloy of any one thereof, or a combination of any two or more thereof. For example, cans made from combinations of metals include cans in which the end(s) or lids of the cans may be made from a different metal than the bodies of the cans, or one metal (e.g., steel) may be coated with another metal (e.g., tin). While a cylindrical can is shown in FIG. 1, the present technology is not so limited. The term "can" may refer to any type of metal container, enclosure, receptacle, or portion thereof that may be used to hold or store a food or beverage and may have any suitable shape. The present BPA-capture system may be used with two-piece, three-piece or deep-drawn cans.

Cans of the present technology include a BPA-containing coating as a first coating on an interior surface(s) of the can (20 in FIG. 1). This BPA-containing coating may be various polymer coatings such as epoxy or polycarbonate, including mixtures or copolymers of epoxy resins such as epoxy-phenolic, epoxy-acrylate, and epoxy-polyester resins. Such BPA-containing coatings are known in the art and are commercially available (e.g., D.E.R. 330, D.E.R. 668-20, etc (Dow chemical company, US)) or may be made known methods such as the procedures described in U.S. Pat. Nos. 4,508,765 and 4,179,418, and PCT publication. WO1998/40443, the contents of each of which are incorporated by reference in their entirety herein. A metal substrate (e.g., a metal sheet to be formed into a can or the preformed can) may be coated with a BPA-containing polymer by various methods known in the art. For example, the can may be coated using coil coating or sheet coating operations wherein a planar coil or sheet of the metal substrate is coated with a BPA-containing polymer composition and hardened (e.g., cured). The coated substrate then is formed into the can end or body. Alternatively, liquid BPA-containing polymer coating compositions may be applied by, e.g., spraying, dipping, rolling, slit coating, etc., to the metal substrate or preformed can and then hardened (e.g., cured). Such techniques are described in e.g., U.S. Pat. No. 4,353,934 and U.S. Pat. No. 7,416,758, each of which is incorporated by reference in their entirety herein.

Epoxy coatings may be hardened using known UV radiation or thermal processes. For example, U.S. Pat. No. 4,146,452 (incorporated by reference herein in its entirety) discloses UV curing methods. Thermal processes may be carried out using oven-heating, irradiation with infrared light (IR drying ovens are available from IR Systems and Specialty Coating Systems) or other standard processes. For example, in an oven, the BPA-containing coating is heated up at 80 degrees C., for 2 hours, then at 150 degrees C. for 2 hours (see example 3 in U.S. Pat. No. 4,554,342; see also *J. App. Polym. Sci.* (1998) 70, 2163-67).

As shown in FIG. 1, the BPA-binding material 30 may be layered over the BPA-containing coating in whole or in part, e.g., as a second coating. The BPA-binding material is an electrospun polymer film (31 in FIG. 1) that binds BPA leaching from the BPA-containing polymer to reduce or eliminate BPA contamination of the food or beverage contents of the can. A coating of BPA-binding material may therefore be configured to bind substantially all of the bisphenol A leaching from the BPA-containing coating. By "substantially all of the bisphenol A" is meant all or at least half of the bisphenol A. Thus, in some embodiments, the BPA-binding material binds at least 50%, at least 60%, at least 70%, at least 80%, at least 90%, at least 95%, at least 97%, at least 98% or at least 99% of the bisphenol A leaching from the BPA-containing layer.

The affinity of the BPA-binding material may be intrinsic (i.e., naturally binds BPA) to the material, or it may be imparted to the material by a method such as molecular imprinting using a bisphenol A compound. By "bisphenol A compound" or "BPA compound" is meant either bisphenol A itself or a compound that sufficiently mimics the structure of bisphenol A so as to impart bisphenol A-binding affinity to the polymer. Thus, bisphenol A compounds generally include the bis-4-hydroxyphenylmethane skeleton and its saturated or partially saturated analogs, Such bisphenol A compounds include without limitation, bisphenol B, bisphenol C, bisphenol E, bisphenol AF, bisphenol F, 4,4'-methylenedicyclohexanol and the like.

A number of materials known to possess intrinsic affinity for BPA may be used as BPA-binding materials including, for example, chitin, chitosan (Advances in Colloid and Interface Science, Volume (2008) 143, 48-67), dextrin (including, e.g., cyclodextrin; see *J. Membrane Sci.* (2009) 332, 129-37), fibroin, keratin (JP 3430257), and the like. These materials can be used singly, as mixtures or in combination with other polymers. As these materials are comprised of oligosaccharides or protein, they are considered safe for use in food/beverage can coatings. In some embodiments, BPA binds to the BPA-binding material with a binding constant of less than about 1 µM, less than about 500 nM, less than about 10 nM, less than about 50 nM, less than about 20 nM or less than about 10 nM. I will be understood that the phrase "less than about" includes values about the value and less than the value. Thus, less than about 1 µM includes values at about 1 µM and values less than 1 µM.

Other BPA-binding materials may be created by the molecular imprinting method. Various polymers may be imprinted with a BPA compound (as defined herein) to provide molecular imprinted polymers (MIPs) such as cellulose, cellulose acetate, cellulose acetate butyrate, lignocellulose, polyamine, N-alkyl acryl amide, N-vinyl pyrrolidone, triethylene glycol dimethacrylate (TEGDMA), trimethylol propane trimethacrylate, and the like. Cellulosic polymers are particularly useful in the present technology as they are generally stable to heat and various solvents/liquids and are thus well-suited to the inner coating of food/beverage cans. In addition, cellulosic polymers provide good strength to the MIP when electrospun. Finally, cellulosic polymers are an abundant natural fiber that is inexpensive and easy to obtain and use.

MIPs for use in the present technology may be produced using methods known in the art (see, e.g., Ikegami et, al. "Synthetic polymers adsorbing bisphenol A and its analogues prepared by covalent molecular imprinting using bisphenol A dimethacrylate as a template molecule" *Anal. Bioanal. Chem.* (2004) 378: 1898-1902). In this process, the BPA compound is the template molecule which is to be imprinted in the polymer. Methods of preparing the MIP may be adapted from Kubo, T., et al. *J. Chromatogr. A* (2004) 1029, 37-41; and Kubo, T., et al. *J. Chromatogr. A* (2003) 987, 389-94. The template molecule and polymer are crosslinked and polymerized using an appropriate cross-linking agent such as chloroform and UV irradiation described in such a reference above. The template molecules are then removed from the polymer to leave the imprint of the BPA compound. To remove the template molecule, the polymer is hydrolyzed with appropriate agent, such as NaOH.

The BPA-binding material may include only the material or mixture of materials described above which have an affinity for BPA, or it may be a mixture with other suitable polymers. Such mixtures may be produced so long as the BPA-binding material and polymer are soluble in a common solvent (so that they may be electrospun together). Such polymers include but are not limited to poly-vinylidene fluoride (PVDF), poly(acrylonitrile-co-methacrylate), polymethylmethacrylate, polyvinylchloride, poly(vinylidenechloride-co-acrylate), polyethylene, polypropylene, nylons such as nylon 12 or nylon-4,6, aramid, polybenzimidazole, polyvinylalcohol, polyvinyl, pyrrolidone-vinyl acetate, poly(bis(2-(2-methoxy-ethoxyethoxy))phosphazene (MEEP), poly(propyleneoxide), poly(ethyleneimine) (PEI), poly(ethylene succinate), polyaniline, poly-(ethylene sulfide), poly(ethyleneterephthalate), poly(ethylene oxide), poly(vinyl acetate), poly(oxymethylene-oligo-oxyethylene), SBS copolymer, poly(hydroxyl butyrate), collagen, poly(lactic acid), poly(glycolic acid), poly(D,L-lactic-co-glycolic acid), polyacrylates, poly(propylene fumarate) poly(caprolactone), or blend of them.

Figure 2:
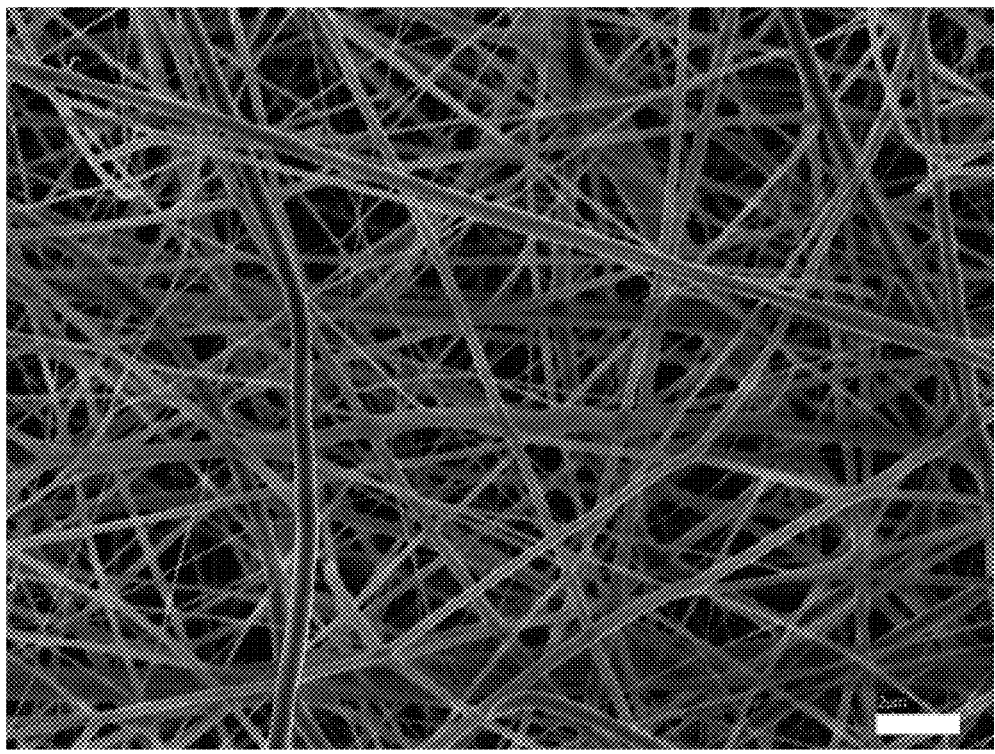
FIG. 2 depicts an illustrative embodiment of an electrospun surface from C. K. S. Pillai and Chandra P. Sharma, "Electrospinning of Chitin and Chitosan Nanofibres" *Trends Biomater. Artif. Organs,* 22(3), 179-201 (2009).

The coating of bisphenol A-binding material is formed by electrospinning to yield a nanofiber structure. The electrospun coating has a micro porous structure (see FIG. 2, for example) which provides a large surface area and is hydrophobic. Therefore, this coating both captures BPA from the BPA-containing polymer, and keeps the food/beverage contents in the can from contacting the BPA-containing coating.

Electrospinning of the BPA-binding material may be carried out using methods known in the art such as, for example, those described in US 2002/0100725 and U.S. Pat. No. 7,390,760. Thus, the BPA-binding material is dissolved in one or more solvents to create a coating solution. Various solvents may be used including, without limitation, water, acetone, chloroform, ethanol, isopropanol, methanol, toluene, tetrahydrofuran, benzene, benzyl alcohol, 1,4-dioxane, propanol, carbon tetrachloride, cyclohexane, cyclohexanone, methylene chloride, phenol, pyridine, trichloroethane, and acetic acid, trifluoroacetic acid (TFA), and the like. Mixtures of such solvents may also be used so long as they result in a single phase. It is within the skill in the art to select a solvent in which the BPA-binding material is soluble.

The concentration of the BPA-binding material in the solvent will depend on the type of the nanofiber desired. Thus, the amount of BPA-binding material in the coating solution may range from about 0.1 wt % to about 40 wt %, from about 1 wt % to about 35 wt %, from about 5 wt % to about 20 wt %, from about 0.1% to about 5 wt %, depending on polymer used and fiber to be produced. Those of skill in the art will be able to adjust the concentration of BPA-binding material in the coating solution to produce the nanofiber structure desired in the coating for a given application.

It will be understood that additional properties of the nanofiber formed such as thickness, diameter and density may also depend on the electrospinning condition such as voltage, time of coating, temperature, and the like. For example, the voltage applied during the electrospinning may range from about 1.0 kV to about 30 kV, from about 5 kV to about 30 kV, or from about 10 kV to about 30 kV. The thickness of the coating may be controlled in the range from about 1 µm to 1 mm, about 1 µm to 500 µm, about 10 µm to 300 µm, and about 10 µm to 200 µm. The diameter of the nanofiber may range from about 5 nm to about 200 nm, from about 5 nm to about 100 nm, from about 5 nm to about 50 nm, from about 10 nm to about 200 nm, from about 10 nm to about 150 nm, or about 10 nm to about 100 nm. Machines for electrospinning are commercially available, such as, e.g., the NEU from Kato Co. Alternatively, the machines described in U.S. Pat. No. 6,713,011 (incorporated by reference in its entirety herein) may be used.

To form the BPA-capture layer on the BPA-containing coating for a food/beverage can, the electrospinning may be done before or after shaping the can. It may also be carried out sequentially after the BPA containing layer is formed. In one embodiment, can stock (a metal sheet with a BPA-containing polymer coating) is coated with nanofiber formed from the BPA-binding material using one or more electrospinning machines or an electrospinning machine with a plurality of spinning nozzles. The can is then formed from the now double-coated can stock using conventional methods.

In another aspect of the present technology, a food or beverage can may be coated with a single coating composition that is a mixture of the BPA containing polymer and the BPA binding material. In this configuration, the BPA-binding material will scavenge any free BPA from the BPA-containing polymer and reduce or prevent its migration into the can contents. The same BPA-binding materials and BPA-containing polymers described above may be used for this coating also. The ratio of the BPA-binding material to BPA-containing polymer in the coating composition may range from about 5 weight percent (wt %) to about 80 wt %, from about 10 wt % to about 80 wt %, from about 20 wt % to about 70 wt %, from about 30 wt % to about 70 wt %, or from about 40 wt % to about 70 wt %. Such compositions may be prepared according to the procedures known in the art such as those disclosed in JP 2009-242556 and JP 3430257. The same procedures and conditions for electrospinning of this coating as described above may be used.

EXAMPLES

The present technology is further illustrated by the following examples, which should not be construed as limiting in any way.

Example 1

Fabrication of Metal Can with Epoxy Coating

A metal can with an epoxy coating is prepared in accordance with the procedures set forth in U.S. Pat. No. 3,960,979 (herein incorporated by reference in its entirety) as follows.
a. First, a polyester diol is prepared as follows. In a suitable vessel, equipped with thermometer, stirrer, condenser, and a nitrogen inlet, are placed the following materials: ethylene glycol, 47.0 grams, 1,2-propylene glycol, 19.0 grams, adipic acid, 138.7 grams, 0.02 gram of phosphoric acid, and 0.005 gram of tetraisopropyl titanate (available from E. I. du Pont de Nemours and Co. under the trade name of Tyzor TPT). The contents of the vessel are heated at approximately 200° C. until the acid number is reduced to one or below. This takes approximately 5 hours. The product polyester diol, poly (ethylene 1,2-propylene adipate) will have a hydroxyl number of about 205, viscosity at 60° C. of about 110 centipoises, and a molecular weight of about 1120.
b. In a suitably equipped reaction vessel is placed approximately 20% of the following solution: methyl methacrylate, 684 grams, ethyl acrylate, 1008 grams, acrylic acid, 108 grams, benzoyl peroxide, 5.4 grams, iso-propanol, 231 grams, 2-methoxy-1-ethanol, 540 grams. The contents of the reaction vessel are heated to 105° C. under a nitrogen purge. The remaining 80% of the above described solution is then added to the reaction vessel over a three-hour time period. The contents of the reaction vessel are maintained at 105° C. for an additional approximately one hour. The resulting polymer will have a composition of methyl methacrylate/ethyl acrylate/acrylic acid (38/56/6 wt/wt/wt). The polymer will have a number average molecular weight of about 30,000 and a weight average molecular weight of about 84,000 as determined by gel permeation chromatography.
c. Thirty five parts of a polyester diol prepared in part (a) is melted at 60° C. To the molten polyester diol is added 4.0 parts of 85% phosphoric acid and 0.1 part of the acrylic terpolymer prepared in part (b) above, in methyl ethyl ketone. To this mixture is added 35.0 parts of "Epon 826" and 30.0 parts of hexamethoxymethylmelamine in methyl ethyl ketone. To the total mix is added sufficient methyl ethyl ketone to obtain a 60% solids solution.

d. The formulation described in (c) above is mixed in a feed tank and pumped to 136 atmospheres (2000 pounds per square inch) through a high pressure air-driven pump to a specially designed hot-melt spray gun. The hot-melt gun was modified from that used in conventional hot-melt application to permit using thermosetting compositions. The modified spray gun includes the following features: minimal material hold up in the heated section of the gun; non-circulating material flow through the heated part of the gun, although external recirculation is possible; air-actuated nozzle control for uniform atomization and for sharp "tail-free" cut-off; and by-pass line for purging the gun when not in use.

The can to be coated is rotated on its axis at a speed of about 2000 revolutions per minute. The gun is mounted on an indexing table and its nozzle is adjusted to ensure complete coverage of the interior of the can. The gun is actuated by an electronically operated air-solenoid for 90 milli-seconds. When a 12-ounce D and I can is used, curing at 205° C. for 2 minutes will result in a dry coating weighing 470 mg. When the gun is actuated for 50 milli-seconds the cured coating weight will be 250 milligrams per can. Alternatively, two-component meter-mix pumping equipment can be used with the hot-melt gun where components A and B are mixed together shortly before use or in the spray gun.

Example 2

Electrospun Coating of Cellulose

A BPA-binding material that is an electrospun cellulose nanofiber coating may be prepared essentially as set forth in K. Ohkawa et al., "Preparation of Pure Cellulose Nanofiber via Electrospinning" *Textile Research Journal* (2009) 79(15): 1396-1401.

Cellulose samples prepared from wood pulp may be purchased from Sigma-Aldrich, Japan. The average molecular weight Mw of the wood pulp cellulose is 36,000 to 40,000. The cellulose samples are dissolved in trifluoroacetic acid (TFA) at room temperature at concentrations (weight %) ranging from 4.0 to 5.0 wt %. The electrospinning is performed on the coated metal can of the above Example 1 at room temperature. The polymer solution is placed into a 3 mL syringe with a capillary tip having an inner diameter of 0.6 mm. A copper wire connected to the positive electrode is inserted into the polymer solution. A copper plate wrapped with aluminum foil is used as the collector and the collector is connected to the ground. A high voltage power supply (HAR-50P2, Matsusada Precision Inc., Japan) is employed to generate the electric field (0-30 kV). The applied voltage and the tip-to-collector distance are 15 kV and 15 cm.

Example 3

Electrospun Coating of Chitosan

An electrospun coating of chitosans may be prepared essentially according to the procedures set forth in Ohkawa, K., "Electrospinning of Chitosan," *Macromol. Rapid Commun*, 2004, 25(18): 1600-1605.

Materials

The viscosity average molecular weights of the chitosan samples may be determined according to the method of Roberts (*International Journal of Biological Macromolecules* (1982) 4:6, 374-377). For the electrospinning experiments, two grades of commercial chitosan may be purchased from Wako Pure Chemical Industries, Ltd., Japan. The first is chitosan10 (viscosity average molecular weight, Mv ¼ $2.1 \times 10^5$;

degree of deacetylation, 0.78), and the second is chitosan100 (Mv ¼ 1.3×10$^6$; degree of deacetylation, 0.77). Poly(vinyl alcohol) (PVA; degree of polymerization, approximately 2,000; Mv ¼ 8.8×10$^4$) may be purchased from Wako. Acetic acid (AcOH), formic acid (FA) and dichloromethane may also be purchased from Wako. Trifluoroacetic acid (TFA) may be obtained from Tokyo Chemical Industry Co., Ltd. All the solvents may be used without further purification.

Electrospinning Apparatus

The electrospinning experiments are performed at room temperature. The polymer solution is placed into a 3 mL syringe with a capillary tip having an inner diameter of 0.6 mm. A copper wire connected to the positive electrode is inserted into the polymer solution. A copper plate wrapped with aluminum foil is used as the collector and the collector is connected to the ground. A high voltage power supply (HAR-50P2, Matsusada Precision Inc., Japan) is employed to generate the electric field (0-30 kV). The applied voltage and the tip-to-collector distance are fixed at 15 kV and 150 mm, respectively.

Electrospinning Procedures

First, PVA is dissolved in distilled water (DW) at a concentration of 9 wt %, and chitosan10 is dissolved in neat FA at 7 wt %. A PVA-DW solution (9 wt %) is mixed with a chitiosan10-FA solution (7 wt %) in the volume ratios 90:10, 70:30, 50:50 and 30:70. Separately, a chitosan100-neat FA (2 wt %, or 0.2 M AcOH) solution is mixed with a PVA-DW solution (9 wt %) in a volume ratio of 50:50. The mixed solutions are then subjected to electrospinning with the apparatus and parameters as described above. Second, the chitosan10 is dissolved at concentrations ranging from 7 to 9 wt % in the following solvents: neat FA, dichloroacetic acid (DCA), TFA and aqueous acetic acid (0.2 M AcOH) and hydrochloric acid (0.1 M HCl), and their mixtures with methanol, ethanol, 1,4-dioxane, dichloromethane, N,N-dimethylformamide or dimethylsulfoxide were used as the solvents. The solvents used for dissolving chitosan10 and PVA are FA and DW, respectively.

Example 4

Electrospun Coating of Dextrin

An electrospun coating of dextrin may be prepared essentially according to the procedures set forth in Uyar, T., et al. "Molecular filters based on cyclodextrin functionalized electrospun fibers" *J. of Membrane Science* (2009) 332, 129-137.

Amorphous polystyrene (Mw=280,000), N,N-dimethylformamide (DMF) (99%), phenolphthalein (ACS reagent) and ethanol (absolute, HPLC grade, ≥99.8%) may be purchased from Sigma-Aldrich. Beta-cyclodextrin (beta-CD) may be purchased from Wacker Chemie AG (Germany). The materials may be used without any purification.

The homogeneous clear solutions are prepared by dissolving PS and beta-CD in DMF at room temperature. The polymer concentration is varied from 15% to 25% (w/v) and the beta-CD content is varied from 10% to 50% (w/w) with respect to polymer. The polymer solutions are placed in a 1-mL syringe fitted with a metallic needle of 0.4 mm inner diameter. The syringe is fixed horizontally on the syringe pump (Model: KDS 101, KD Scientific), and a electrode of a high voltage power supply (Spellman High Voltage Electronics Corporation, MP Series) is clamped to the metal needle tip. The flow rate of polymer solution is 1 mL/h and the applied voltage is 15 kV. The tip-to-collector distance is set to 10 cm and a grounded stationary rectangular metal collector (15 cm×20 cm), covered by a piece of clean aluminum foil, is used for the fiber deposition. The whole electrospinning apparatus is enclosed in glass box, and the electrospinning is carried out in a horizontal position at room temperature. The fibers collected on aluminum foil are dried at 40° C. under vacuum oven for 24 h to remove the residual solvent.

Example 5

Electrospun Coating of Fibroin, Keratin

An electrospun coating of fibroin and/or keratin may be prepared essentially according to the procedures set forth in Ki et al. *J. of Membrane Science* (2007) 302:1-2, 20-26.

For the electrospinning, the pure SF (silk fibroin) and WK (wool keratose)/SF (50/50 mixture ratio) blend dopes are prepared by dissolving in 98% formic acid at room temperature for 4 h and the concentration of the SF and WK/SF dopes are 12% and 15%, respectively. The solutions are filtered to remove impurities. Then, each dope solution is placed in a 10-ml syringe with stainless steel syringe needle (22 G) as an electrode which connected to power supply (Chungpa EMT High Voltage Supply, Korea). The syringe is loaded in a syringe pump (KD Scientific, USA) to control a flow rate accurately with spinning rate. Rolling stainless drum is used as a collector for obtaining sheet type nanofiber assemblies and grounded. The flow rate of dope solution is controlled to maintain a constant size of droplet at the tip of the syringe needle. The electrospinning condition is performed at room temperature and 60% (RH) humidity. Electric potential and distance to collector were fixed at 12 kV and 10 cm, respectively.

Example 6

Molecular Imprinting Polymer Made with BPA

An electrospun coating of fibroin and/or keratin may be prepared essentially according to the procedures set forth in Ikegami et al., "Synthetic polymers adsorbing bisphenol A and its analogues prepared by covalent molecular imprinting using bisphenol A dimethacrylate as a template molecule" *Anal. Bioanal. Chem.* (2004) 378: 1898-1902 as follows.

BPA dimethacrylate is purchased from Aldrich (Milwaukee, Wis., USA). Chloroform is purified by distillation prior to use. Triethylene glycol dimethacrylate (TEGDMA) and trimethylol propane trimethacrylate (TRIM) may be obtained from Wako Pure Chemical Industry (Osaka, Japan) and are used after shaking with an inhibitor remover (Aldrich).

BPA dimethacrylate-based polymers with TEGDMA (TE-P) and BPA dimethacrylate-based polymers with TRIM (TR-P) are each prepared with a different cross-linking agent, TEGDMA or TRIM, respectively. The preparation of TE-P is carried out as follows.

A solution of BPA dimethacrylate (420 mg, 1.15 mmol) in chloroform (17.2 mL) is added to TEGDMA (9.33 g, 32.6 mmol) and 2,2'-azobis(isobutyronitrile) (82.5 mg) in a glass tube. The mixture is purged with nitrogen gas for 3 min and is polymerized by UV irradiation for 18 h at 5° C. The polymer obtained is crushed roughly, washed with methanol and dried in vacuo. TR-P using TRIM (11.0 g, 32.6 mmol) is prepared in the same manner as described above.

Hydrolysis conditions for cleavage of BPA from TE-P and TR-P and preparation of TE-PH and TR-PH particles (198 mg, containing BPA 23.4 µmol and TEGDMA 663 µmol) are heated under reflux in ethanol-water (85:15, v/v, 10 mL) solutions of different concentrations of sodium hydroxide. The polymer suspension is cooled, then acidified to around pH 2 with dilute hydrochloric acid, stirred for 30 min, and filtered. The polymer is washed with dilute hydrochloric acid and methanol (50 mL) in triplicate. All washings are collected and BPA and triethylene glycol (TEGOH) released from the polymer are determined.

BPA is analyzed by means of a Gilson HPLC system consisting of two pumps (models 305 and 306), an auto-injector (model 234), and a UV-visible detector (model 119); Supelcosil LC-8-DB reverse-phase column (5 µm, 150 mm×4.6 mm i.d.; Supelco) is used with water-acetonitrile (60:40, v/v, 1.0 mL min$^{-1}$) as mobile phase. The sample volume injected is 10 µL. The effluent was monitored at 260 nm. Determination of TEGOH is carried out with an LC-MS system consisting of two Gilson Model 306 pumps, a Gilson autoinjector Model 231XL, and API-2000 mass spectrometer (Applied Biosystems, USA). Positive-ion mode is used for both Q1 scan and product-ion scan with an ion-spray voltage of 5000 V. The mobile phase is water containing 0.1% acetic acid-methanol (1:1, v/v) and the flow rate is 0.2 mLmin$^{-1}$. The sample volume was 10 µL. TR-P particles (233 mg, containing BPA 23.4 µmol and TRIM 663 µmol) are also treated under the same conditions described above.

The amount of BPA released is determined by means of the above HPLC system. Trimethylol propane (TRIMOH) in the washings is determined by means of the above LC-MS system with water containing 0.1% acetic acid-acetonitrile (1:1, v/v, 0.2 mL min$^{-1}$) as mobile phase and the sample adjusted to 0-10 µmol L$^{-1}$ in analysis of TRIMOH. TE-PH and TR-PH are prepared for chromatographic tests under the conditions determined by the above experiments: TE-P particles (5.94 g, containing BPA 703 µmol) were heated under reflux in 1.0 mol L$^{-1}$ sodium hydroxide ethanol-water solution (85:15, v/v, 300 mL) for 48 h. The polymer suspension is cooled, then acidified to around pH 2 with dilute hydrochloric acid, stirred for 30 min, and filtered. The polymer is washed with dilute hydrochloric acid and methanol in triplicate, ground, and sieved (32-63 µm). TR-PH is prepared in the same manner except for the amounts of TR-P particles (5.83 g, containing BPA 586 µmol).

Electrospinning of the MIP may be carried out under the following conditions. The polymer obtained as above is dissolved in distilled water (10 wt %). The flow rate of polymer solution is 1 mL/h and the applied voltage is 15 kV. The tip-to-collector distance is set to 10 cm.

Example 7

Assay of BPA Absorption by Electrospun-Coated Cans

Three metal cans are fabricated according to Example 2 (test cans) and three metal cans are fabricated according to Example 1 (controls). Each can is filled with an acidic aqueous solution simulating, e.g., orange or tomato juice (pH 3-5), and which does not contain any detectable BPA. The cans are heated to boiling for 30 minutes. Upon cooling, samples of the water from each can are assayed by HPLC for dissolved BPA using the system described in Example 6. The water from the cans without the electrospun coating will show a significant concentration of BPA, whereas the water from cans with the electrospun coating will show little or no detectable BPA.

EQUIVALENTS

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A metal can comprising:
an interior surface coated with a single electrospun coating comprising both a bisphenol A containing polymer and a bisphenol A binding material;
wherein the bisphenol A binding material binds substantially all of the bisphenol A leaching from the bisphenol A containing polymer; and wherein the ratio of the bisphenol A binding material to the bisphenol A containing polymer is from 20 weight percent to 70 weight percent.

2. The metal can of claim 1, wherein the metal is selected from the group consisting of iron, aluminum, tin, steel, an alloy of any one thereof, and a combination of any two or more thereof.

3. The metal can of claim 1, wherein the bisphenol A binding material naturally binds bisphenol A.

4. The metal can of claim 3, wherein the bisphenol A binding material is selected from chitin, chitosan, dextrin, fibroin, keratin or mixtures of any two or more thereof.

5. The metal can of claim 1, wherein the bisphenol A binding material has been adapted to binding bisphenol A by molecular imprinting using a bisphenol A compound or a bisphenol A analog.

6. The metal can of claim 5, wherein the bisphenol A binding material is selected from the group consisting of cellulose, cellulose acetate, cellulose acetate butyrate, lignocellulose, polyamine, N-alkyl acrylamide, N-vinyl pyrrolidone and a mixture of any two or more thereof.

7. The metal can of claim 1, wherein the coating comprises an epoxy resin or polycarbonate resin.

8. The metal can of claim 1, wherein the ratio of the bisphenol A binding material to the bisphenol A containing polymer is from 30 weight percent to 70 weight percent.

9. The metal can of claim 1, wherein the ratio of the bisphenol A binding material to the bisphenol A containing polymer is from 40 weight percent to 70 weight percent.

10. A method of manufacturing comprising:
forming a single electrospun coating comprising both a bisphenol A containing polymer and a bisphenol A binding material on a metal substrate; wherein the ratio of the bisphenol A binding material to the bisphenol A containing polymer is from 20 weight percent to 70 weight percent.

11. The method of claim 10, wherein the metal substrate is a metal sheet.

12. The method of claim 11, further comprising:
forming a can from the metal sheet such that the coating comprises an interior surface of the can;
wherein the can forming may occur before or after the formation of the electrospun coating.

13. The method of claim 10, wherein the coating comprises an epoxy resin or polycarbonate resin.

14. The method of claim 10, wherein the bisphenol A binding material is selected from chitin, chitosan, dextrin, fibroin, keratin or mixtures of any two or more thereof.

15. The method of claim 10, wherein the bisphenol A binding material is selected from the group consisting of cellulose, cellulose acetate, cellulose acetate butyrate, lignocellulose, polyamine, N-alkyl acrylamide, N-vinyl pyrrolidone and a mixture of any two or more thereof.

16. The method of claim 10, wherein the ratio of the bisphenol A binding material to the bisphenol A containing polymer is from 30 weight percent to 70 weight percent.

17. A method comprising:
filling a can in whole or in part with a food or a beverage, wherein the can comprises an interior surface coated with a single electrospun coating comprising both a bisphenol A containing polymer and a bisphenol A binding material; wherein the ratio of the bisphenol A binding material to the bisphenol A containing polymer is from 20 weight percent to 70 weight percent.

* * * * *